UNITED STATES PATENT OFFICE.

WERNER MOOSER-SCHIESS, OF BERN-LIEBEFELD, SWITZERLAND.

PLASTIC MATERIAL AND PROCESS OF MAKING SAME.

1,317,721. Specification of Letters Patent. Patented Oct. 7, 1919.

No Drawing. Original application filed January 30, 1919, Serial No. 274,132. Divided and this application filed July 9, 1919. Serial No. 309,746.

*To all whom it may concern:*

Be it known that I, WERNER MOOSER-SCHIESS, doctor of philosophy, chemist, a citizen of Switzerland, residing at Bern-Liebefeld, Switzerland, have invented new and useful Improvements in Plastic Material and Processes of Making Same, of which the following is a specification.

The present invention refers to a new plastic mass and the process for making the same.

In my copending application Serial No. 274,132, Jan. 30, 1919, plastic masses are described consisting of yeast and esters of the organic acids, especially monovalent organic acids, with polyvalent alcohols.

The plastic masses of the new invention consist of yeast and esters of the polyvalent organic acids, especially of the aromatic series, with polyvalent alcohols. Suitable esters are those of the bibasic aromatic acids, for instance glycerin esters of phthalic acid or naphthalic acid and such like. Also glycerin esters of the polyvalent cyclic acids may be used, for instance of the camphane series, as camphor acid. I may also use esters of polyvalent alcohols which contain besides the alcohol groups other groups, for instance acetylated starch, acetylated sugar, acetylated cellulose.

The process for making the new masses consists in mixing yeast with the esters, suitably in heating the mixture, I may also add suitable organic solvents for the esters, especially solvents of low boiling point, *i. e.*, below 100 degrees centigrade. It is suitable to make the mixture while being heated under diminished pressure. The esters are agitated with the yeast, until a mass of the desired plastic properties is formed. One may knead and mix the components under diminished pressure and roll the mass. Finally one may subject the masses to a high pressure, for instance a hydraulic pressure.

In order to influence the hardness or elasticity one may add filling materials or substances which make plastic masses flexible. Such additions are for instance: cellulose, resins, kieselguhr, mica, soap. According to the nature and proportion of the said addition one may produce gum like or horny masses.

To carry out the present process one may liquefy the yeast, for instance by heating, a step which may however also be omitted.

Especially suitable for making the plastic masses is wet yeast, the alcohol of which is very useful. One mixes wet yeast, preferably under addition of cellulose derivatives, as acetylated cellulose, nitrocellulose especially collodium wool, with the esters under diminished pressure below 100 degrees centigrade and agitates the mixture under pressure.

Dry yeast is heated with glycerin to temperatures at which glycerin, but not the yeast or the plastic masses are decomposed. One may add the esters to the glycerin, but also after the yeast has been treated alone with glycerin. The mixture of the yeast and the glycerin or its decomposition products and the esters are kneaded in the hot state under diminished pressure. If the esters had not been added to before one adds them during the kneading operation.

Instead of glycerin one may mix yeast with other nonvolatile solvents or wetting liquids, as vegetable, animal or mineral oils.

During or after the action of the esters one may add substances which harden yeast, for instance formaldehyde, its polymers, as paraformaldehyde, trioxymethylene, or substances splitting off formaldehyde, as for instance hexamethylenetetramin.

One employs suitable yeast, the bitter tasting substances of which had not been extracted, because the resin of bitter yeast assists the process.

*Examples.*

For making a suitable plastic mass one may mix 1000 grams dry yeast, 100 grams glycerin ester of phthalic acid, 40 grams filling materials, as for instance chalk. Another suitable plastic mass consists of 1000 grams wet yeast, 200 grams glycerin ester of naphthalic acid and 500 grams glycerin.

One may use different esters of polyvalent alcohols in mixture with each other. A hard gum like mass is obtained with 50 grams glycerin ester of phthalic acid, 10–40 grams dry yeast, 100 grams acetylated cellulose.

One may use 1000 grams dry yeast, 100 grams glycerin ester of camphor acid, 40 grams chalk.

A suitable manner for making the masses is to add the esters, to liquefied yeast, agitate and knead or roll the mass and heat with a hardening agent. In order to influence the mechanical properties one adds successively to the mixture of yeast and esters, resin, camphor, etc., especially a solution of camphor in acetone. The mixture may be effected under diminished pressure.

The filling materials are suitably added when the foaming in vessels under diminished pressure begins to diminish.

I claim:

1. Plastic masses containing yeast and esters of the polyvalent acids with glycerin.

2. Plastic masses containing yeast, esters of the polyvalent acids with polyvalent alchols and cellulose esters.

3. The process for making plastic masses which consists in heating yeast with esters of the polyvalent acids with polyvalent alcohols.

4. The process for making plastic masses which consists in heating yeast and esters of the polyvalent acids with glycerin.

5. The process for making plastic masses which consists in heating yeast and esters of the polyvalent acids with polyvalent alcohols under diminished pressure.

6. The process for making plastic masses which consists in heating yeast glycerin and esters of the polyvalent acids with polyvalent alcohols.

In testimony whereof I have signed my name to this specification.

WERNER MOOSER-SCHIESS.